(12) United States Patent
Kim et al.

(10) Patent No.: US 9,892,815 B2
(45) Date of Patent: Feb. 13, 2018

(54) ELECTRICAL CONDUCTORS, ELECTRICALLY CONDUCTIVE STRUCTURES, AND ELECTRONIC DEVICES INCLUDING THE SAME

(71) Applicant: SAMSUNG ELECTRONICS CO., LTD., Suwon-si, Gyeonggi-do (KR)

(72) Inventors: Se Yun Kim, Seoul (KR); Jong Wook Roh, Anyang-si (KR); Woojin Lee, Suwon-si (KR); Jongmin Lee, Hwaseong-si (KR); Doh Won Jung, Seoul (KR); Sungwoo Hwang, Suwon-si (KR); Chan Kwak, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/275,538

(22) Filed: Sep. 26, 2016

(65) Prior Publication Data

US 2017/0092387 A1 Mar. 30, 2017

(30) Foreign Application Priority Data

Sep. 25, 2015 (KR) .................. 10-2015-0136925

(51) Int. Cl.
| | | |
|---|---|---|
| *B32B 3/00* | (2006.01) | |
| *H01B 1/08* | (2006.01) | |
| *H01B 1/16* | (2006.01) | |
| *H01B 5/14* | (2006.01) | |
| *H01B 13/00* | (2006.01) | |
| *H01B 1/00* | (2006.01) | |
| *G06F 3/041* | (2006.01) | |

(52) U.S. Cl.
CPC .............. *H01B 1/08* (2013.01); *H01B 1/00* (2013.01); *H01B 1/16* (2013.01); *H01B 5/14* (2013.01); *H01B 13/0036* (2013.01); *G06F 3/041* (2013.01); *G06F 2203/04102* (2013.01); *G06F 2203/04103* (2013.01)

(58) Field of Classification Search
CPC ... H01B 1/00; H01B 1/08; H01B 1/16; H01B 5/14; H01B 13/0036; G06F 3/041; G06F 2203/04102; G06F 2203/04103
See application file for complete search history.

(56) References Cited

U.S. PATENT DOCUMENTS

| | | | |
|---|---|---|---|
| 3,607,789 | A | 9/1971 | Murthy et al. |
| 5,995,359 | A | 11/1999 | Klee et al. |

(Continued)

FOREIGN PATENT DOCUMENTS

| | | |
|---|---|---|
| JP | 2009-173785 A | 8/2009 |
| JP | 2010-083734 A | 4/2010 |

(Continued)

OTHER PUBLICATIONS

European Search Report for European Patent Application No. 16190652.4 dated Jan. 26, 2017.

*Primary Examiner* — Elizabeth E Mulvaney
(74) *Attorney, Agent, or Firm* — Cantor Colburn LLP

(57) ABSTRACT

An electrical conductor including a first conductive layer including a plurality of ruthenium oxide nanosheets, wherein the plurality of ruthenium oxide nanosheets include an electrical connection between contacting ruthenium oxide nanosheets and at least one of the plurality of ruthenium oxide nanosheets includes a plurality of metal clusters on a surface of the at least one ruthenium oxide nanosheet.

24 Claims, 11 Drawing Sheets

(56) References Cited

U.S. PATENT DOCUMENTS

| | | | |
|---|---|---|---|
| 7,514,065 B2 | 4/2009 | Takasu et al. | |
| 7,585,349 B2 | 9/2009 | Xia et al. | |
| 8,728,358 B2 | 5/2014 | Ikisawa et al. | |
| 8,828,488 B2 | 9/2014 | Sasaki et al. | |
| 2006/0231806 A1 | 10/2006 | Barker et al. | |
| 2010/0200286 A1 | 8/2010 | Melcher et al. | |
| 2012/0153236 A1 | 6/2012 | Cakmak et al. | |
| 2012/0300168 A1 | 11/2012 | Hoke | |

FOREIGN PATENT DOCUMENTS

| | | |
|---|---|---|
| JP | 2010188549 A | 9/2010 |
| JP | 2010280977 A | 12/2010 |
| KR | 1020130102158 A | 9/2013 |
| KR | 1020130107460 A | 10/2013 |
| WO | 2009/065180 A1 | 5/2009 |
| WO | 2010/119687 A1 | 10/2010 |

…

ELECTRICAL CONDUCTORS, ELECTRICALLY CONDUCTIVE STRUCTURES, AND ELECTRONIC DEVICES INCLUDING THE SAME

CROSS-REFERENCE TO RELATED APPLICATION

This application claims priority to and the benefit of Korean Patent Application No. 10-2015-0136925, filed in the Korean Intellectual Property Office on Sep. 25, 2015, and all the benefits accruing therefrom under 35 U.S.C. § 119, the content of which is incorporated herein by reference in its entirety.

BACKGROUND

1. Field

Electrical conductors, methods of producing the electrical conductor, and an electronic device including the electrical conductor are disclosed.

2. Description of the Related Art

An electronic device, such as a flat panel display, such as for example a liquid crystal display (LCD) or light-emitting diode (LED) display, a touch screen panel, a solar cell, a transparent transistor, and the like, may include an electrically conductive thin film or a transparent electrically conductive thin film. It is desirable for a material of an electrically conductive film to have high light transmittance (e.g., greater than or equal to about 80% in a visible light region) and low specific resistance (e.g., less than or equal to about $1\times10^{-4}$ ohm centimeter ($\Omega\cdot cm$)). Currently available metal oxide materials used in transparent electrically conductive thin films include indium tin oxide (ITO), tin oxide ($SnO_2$), zinc oxide (ZnO), and the like. ITO is a transparent electrode material and a transparent semiconductor having a wide bandgap of 3.75 electron volts (eV), and may be manufactured in a large area using a sputtering process. However, for application to a flexible touch panel, or a UD-grade high resolution display, ITO has poor flexibility and a higher cost due to limited reserves of indium. Therefore, development of an alternative material is desired.

Recently, a flexible electronic device, e.g., a foldable or bendable electronic device, is being developed as a next generation electronic device. Therefore, there is a need for a material having improved transparency, relatively high electrical conductivity, and suitable flexibility, as well as transparent electrode materials.

SUMMARY

An embodiment provides a flexible electrical conductor having improved conductivity and improved light transmittance.

Another embodiment provides a method of producing the electrical conductor.

Yet another embodiment provides an electronic device including the electrical conductor.

In an embodiment, an electrical conductor includes:
a first conductive layer including a plurality of ruthenium oxide nanosheets, wherein the plurality of ruthenium oxide nanosheets includes an electrical connection between contacting ruthenium oxide nanosheets of the plurality of ruthenium oxide nanosheets, and
at least one ruthenium oxide nanosheet of the plurality of ruthenium oxide nanosheets includes a plurality of metal clusters on a surface of the at least one ruthenium oxide nanosheet.

The plurality of metal clusters may be adsorbed on the surface of the at least one ruthenium oxide nanosheet.

The plurality of metal clusters may be present on a top surface of the plurality of ruthenium oxide nanosheets.

The plurality of metal clusters may be present between two ruthenium oxide nanosheets.

The plurality of metal clusters may be present on a top surface of the plurality of ruthenium oxide nanosheets and between two ruthenium oxide nanosheets.

The metal cluster may include a metal having a work function that is less than a work function of the ruthenium oxide.

The metal may include a noble metal, a transition metal, an alkali metal, a rare earth metal, or a combination thereof.

The metal may include Cs, Rb, Ba, Ra, K, Sr, Eu, Yb, Na, Ca, Y, Li, Lu, Sc, La, Mg, Hf, Zr, Mn, Ta, V, Nb, Ti, Cu, Cr, Fe, Ag, Al, W, Mo, Ru, Os, Rh, Co, Au, Ni, Pd, Be, Ir, Pt, Re, or a combination thereof.

The metal cluster may have a dimension that is greater than about 1 angstrom and less than or equal to about 1000 nanometers (nm).

The metal cluster may include a metal, and an amount of the metal is greater than or equal to about 1 atomic percent (at. %), based on 100 at. % of the ruthenium metal.

The electrical conductor may include a second conductive layer which is disposed on a surface of the first conductive layer and includes a plurality of conductive metal nanowires, The conductive metal may include silver (Ag), copper (Cu), gold (Au), aluminum (Al), cobalt (Co), palladium (Pd), or a combination thereof.

The electrical conductor may be a transparent conductive film.

The ruthenium oxide nanosheets may have an average lateral size of about 0.5 micrometer ($\mu m$) to about 100 $\mu m$.

The ruthenium oxide nanosheets may have a thickness of less than or equal to about 3 nanometers (nm).

The first conductive layer may be a discontinuous layer including an open space disposed between at least two of the ruthenium oxide nanosheets of the plurality of ruthenium oxide nanosheets, and wherein an area of the open space with respect to the total area of the second conductive layer may be less than or equal to about 50%.

The electrical conductor may have sheet resistance of less than or equal to about 5,000 ohms per square ($\Omega$/sq) as measured by a four point probe method and a light transmittance of greater than or equal to about 85%, for light having a wavelength of 550 nm at a thickness of less than or equal to about 100 nm.

At least one of the first conductive layer and the second conductive layer may further include a binder.

The electrical conductor may further include an overcoating layer including a thermosetting resin, an ultraviolet (UV)-curable resin, or a combination thereof on at least one of the first conductive layer and the second conductive layer.

In some embodiments, a method of producing the aforementioned electrical conductor includes:
providing a first conductive layer including a ruthenium oxide nanosheet;
dissolving a metal salt compound in water to obtain an aqueous metal salt solution; and
contacting the aqueous metal salt solution with a surface of the first conductive layer for a predetermined time to form a plurality of metal clusters on the surface of the first conductive layer.

The metal of the metal salt compound may have a work function that is less than a work function of the ruthenium oxide.

The metal may include a noble metal, a transition metal, an alkali metal, a rare earth metal, or a combination thereof.

The concentration of a metal in the aqueous metal salt solution may be greater than or equal to about 0.001 moles per liter (mol/L).

The contacting may include dipping, spraying, coating, or a combination thereof.

The method may further include washing the surface of the first conductive layer with a solvent to remove the metal salt compound.

In another embodiment, an electronic device including the electrical conductor is provided.

The electronic device may be a flat panel display, a touch screen panel, a solar cell, an e-window, an electrochromic mirror, a heat mirror, a transparent transistor, or a flexible display.

According to an embodiment, the method of producing an electrical conductor including ruthenium oxide nanosheets may produce the conductor having decreased sheet resistance and enhanced electrical conductivity without having an adverse effect on light transmittance. Therefore, a flexible electrical conductor with enhanced conductivity and relatively high light transmittance may be produced.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
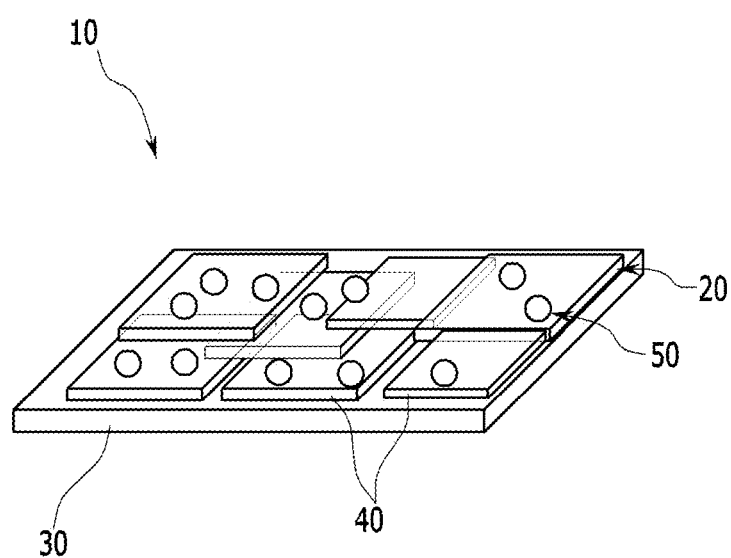
FIG. 1 is a schematic illustration of an electrical conductor including a plurality of ruthenium oxide nanosheets with metal clusters according to an embodiment.
Figure 2A:
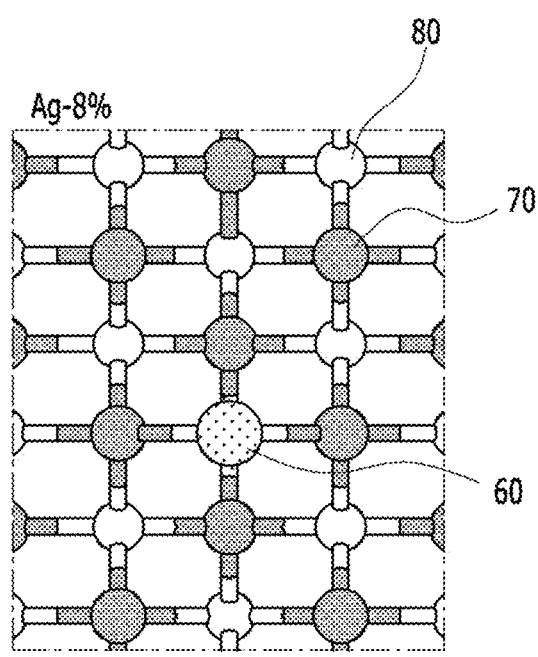
FIG. 2A is a schematic illustration of a top view of a structure of a metal cluster adsorbed on a surface of a plurality of ruthenium oxide nanosheets.
Figure 2B:
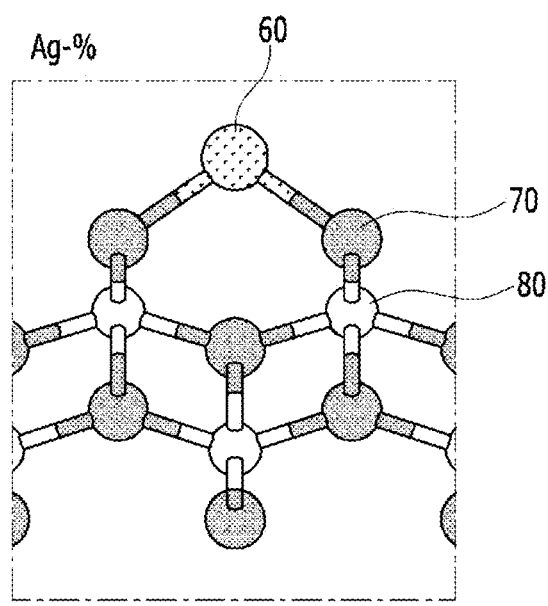
FIG. 2B is schematic illustration of a side view of the structure in FIG. 2A, according to a non-limiting embodiment.

Advantages and characteristics of this disclosure, and a method for achieving the same, will become evident referring to the following exemplary embodiments together with the drawings attached hereto. However, this disclosure may be embodied in many different forms and is not to be construed as limited to the embodiments set forth herein. If not defined otherwise, all terms (including technical and scientific terms) in the specification may be defined as those commonly understood by one skilled in the art. The terms defined in a dictionary are not to be interpreted ideally or exaggeratedly unless clearly defined otherwise. In addition, unless explicitly described to the contrary, the word "comprise" and variations such as "comprises" or "comprising" will be understood to imply the inclusion of stated elements but not the exclusion of any other elements.

Further, the singular includes the plural unless mentioned otherwise.

In the drawings, the thickness of layers, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the phrase "a first element is disposed on a second element" means that the first element is adjacent to (e.g., is in contact with) the second element and the upper and lower position therebetween is not defined.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the context clearly indicates otherwise. "At least one" is not to be construed as limiting to "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "sheet resistance" refers to a value measured using a four-point probe method for a specimen having a predetermined size.

"Transition metal" as defined herein refers to an element of Groups 3 to 11 of the Periodic Table of the Elements.

"Rare earth" means the fifteen lanthanide elements, i.e., atomic numbers 57 to 71, plus scandium and yttrium. The "lanthanide elements" means the chemical elements with atomic numbers 57 to 71.

"Noble metal" as used herein refers to the metallic elements ruthenium, rhodium palladium, silver, osmium, iridium, platinum, and gold.

As used herein, a transmittance of a material is a percentage of light which is transmitted through a material, where the value excludes light absorption of a substrate.

In an embodiment, as illustrated in FIG. 1, an electrical conductor 10 includes a first conductive layer 20 on a substrate 30, the first conductive layer 20 including a plurality of ruthenium oxide nanosheets 40. In the electrical conductor, at least two of the ruthenium oxide nanosheets are in contact with one another to provide an electrical connection (e.g., the electrically conduction path). At least one of the ruthenium oxide nanosheets has a plurality of metal clusters 50 on a surface thereof. As used herein, "the nanosheets being in contact with one another to provide an electrical connection (e.g., the electrically conduction path)" refers to the case where the contact between the nanosheets is made to provide an electrical conduction path, and thereby the conductive layer has an electrical conductivity (for example, of a sheet resistance of less than or equal to about 1,000,000 ohm/sq.) As used herein, the term "metal cluster" refers to a population including a plurality of metal atoms that are gathered (e.g. clustered) close together. The first conductive layer may be disposed on a substrate.

Ruthenium oxide may be exfoliated into a nanosheet via intercalation and the ruthenium oxide nanosheets thus prepared may have a high potential to be used in an electrical conductor (e.g., a material for transparent electrodes). As used herein, the term "ruthenium oxide" refers to a material represented by $RuO_{2+x}$, wherein x is 0 to 0.1.

The ruthenium oxide nanosheet may be prepared by any suitable method and may be a suitable commercially available ruthenium oxide nanosheet.

In some embodiments, nanosheets of the ruthenium oxide may be prepared from an alkali metal ruthenium oxide (e.g., an alkaline metal ruthenium oxide of the formula $MRuO_2$, wherein M is Na, K, Rb, or Cs), which has a layered structure (for example, a structure of the form $M-RuO_2-M-RuO_2-M$ for the alkali metal ruthenium oxide). The alkali metal ruthenium oxide may be obtained by mixing an alkali metal compound with ruthenium oxide and calcining or melting the obtained mixture at an appropriate temperature, for example, about 500° C. to about 1000° C. When the obtained alkali metal ruthenium oxide is treated with an acid solution, at least a portion of the alkali metal undergoes proton-exchange to provide a proton-type alkali metal ruthenate hydrate. The obtained proton-type alkali metal ruthenate hydrate may react with a C1 to C20 alkylammonium or a C1 to C20 alkylamine to provide a C1 to C20 alkylammonium-substituted compound or a C1 to C20 alkylamine-substituted compound, which is then mixed with a solvent and exfoliated into nanosheets, thereby producing ruthenium oxide nanosheets. The solvent may be a high dielectric constant solvent. For example, the solvent may comprise water, alcohol, acetonitrile, dimethyl sulfoxide, dimethyl formamide, propylene carbonate, or a combination thereof.

For example, during the protonation of $Na_aRuO_{2+x}$ wherein x is 0 to 0.5 (e.g., 0.1) and a is about 0.1 to about 1, $Na_aRuO_{2+x}$ and an acid compound (e.g., HCl) react with one another, and thereby $Na^+$ is substituted with $H^+$ to prepare a protonized layered ruthenium oxide (e.g., $H_aRuO_{2+x}$). Subsequently, during the exfoliation, the $H_aRuO_{2+x}$ may be reacted with an alkyl ammonium salt intercalant (e.g., tetraalkyl ammonium hydroxide and the like), so that $H^+$ may be replaced with an alkyl ammonium cation (e.g., tetrabutylammonium cation, $TBA^+$). The alkyl ammonium salt may be a C1 to C16 alkyl ammonium salt. While not wanting to be bound by theory, it is believed that the intercalant molecule (e.g., TBAOH) has such a large size that when it is interposed between the $RuO_{2+x}$ layers an interlayer distance between the individual layers is increased, causing an interlayer separation. Thus, adding the same into a solvent and agitating causes exfoliation to provide $RuO_{2+x}$ nanosheets.

In order to prepare the exfoliated $RuO_{2+x}$ nanosheets from the layered metal oxide material, the exfoliated obtained nanosheets may be have an average thickness of greater than or equal to about 1 nm (e.g., greater than about 1 nm) and less than or equal to about 2 nm. In some embodiments the exfoliation of the alkali metal ruthenium oxide may be carried out using at least two types of intercalant compounds having different sizes.

The at least two intercalant compounds having different sizes may comprise a tetramethylammonium compound (e.g., tetramethylammonium hydroxide), a tetraethylammonium compound (e.g., tetraethylammonium hydroxide), a tetrapropylammonium compound (e.g., tetrapropylammonium hydroxide), a benzyl trialkyl ammonium compound (e.g., benzyl trimethylammonium hydroxide), a tetrabutylammonium compound (e.g., tetrabutylammonium hydroxide), or a combination thereof, but it is not limited thereto.

In some embodiments, the protonated metal oxide may be treated with a first intercalant having a small size and a second intercalant having a large size, but the treatment is not limited thereto. Examples of the first intercalant having a small size may include tetramethylammonium hydroxide, tetraethylammonium hydroxide, or a combination thereof. Examples of the second intercalant having a large size may include tetrabutylammonium hydroxide, benzyltrimethylammonium hydroxide, or a combination thereof.

The ruthenium oxide nanosheets may have an average lateral size, e.g., a length or width dimension in an in-plane direction, of greater than or equal to about 0.5 μm, for example greater than or equal to about 1 μm, greater than or equal to about 2 μm, greater than or equal to about 3 μm, greater than or equal to about 4 μm, greater than or equal to about 5 μm, or greater than or equal to about 6 μm. The ruthenium oxide nanosheets may have an average lateral size of less than or equal to about 100 μm, for example less than or equal to about 30 μm, less than or equal to about 20 μm, less than or equal to about 10 μm, less than or equal to about 9 μm, less than or equal to about 8 μm, or less than or equal to about 7 μm. The average lateral size of the nanosheets may be determined in a Scanning Electron Microscopy analysis wherein a predetermined number (e.g., about 100) of nanosheets are randomly selected and for each of the selected nanosheets, the largest value of a length or width dimension is measured and an average of the measured values is calculated.

The ruthenium oxide nanosheets may have an average thickness of less than or equal to about 3 nm, for example less than or equal to about 2.5 nm, or less than or equal to about 2 nm. The ruthenium oxide nanosheets may have an average thickness of greater than or equal to about 1 nm, for example greater than about 1 nm. When the lateral size of the nanosheets is from about 0.5 μm to about 100 μm the contact resistance between the nanosheets may be decreased. When the average thickness of the ruthenium oxide nanosheets is less than or equal to about 3 nm, improved transmittance may be obtained.

The ruthenium oxide nanosheets thus obtained may have a relatively high level of inherent sheet resistance. For example, the sheet resistance of the ruthenium oxide nanosheet is about 23,000 ohm/sq. as obtained by a computational simulation. Therefore, it is desirable to enhance the conductivity of the nanosheets for the improvement of the electrical conductor using the ruthenium oxide nanosheet.

Figure 3:
FIG. 3 is a schematic illustration of an electrical conductor including a plurality of ruthenium oxide nanosheets with metal (Ag) clusters according to a non-limiting embodiment.
Figure 4:
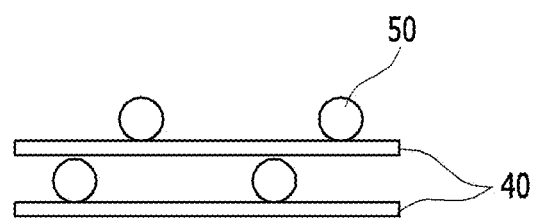
FIG. 4 is a schematic illustration of a ruthenium oxide nanosheet including metal (Ag) clusters according to a non-limiting embodiment.

Referring to FIGS. 3 and 4, in some embodiments, the ruthenium oxide nanosheet has a metal cluster on a surface thereof and thereby the electrical conductor including the ruthenium oxide nanosheet may have a lower level of sheet resistance. The metal cluster may include a metal having a work function that is lower than the work function of the ruthenium oxide. Without wishing to be bound by theory, it is believed that the metal cluster present on a surface of the ruthenium oxide nanosheets may provide the ruthenium oxide with electrons. In other words, electron transfer from the metal cluster to the ruthenium oxide may occur, and as a result, the electrical conductivity of the nanosheets may be improved.

The work function of the ruthenium oxide is about 6.94 electron volts (eV) as obtained by computational simulation using the methodology of the simulation of Vienna Ab-initio Simulation Package, as described in Physical Review. B, vol. 46, page 7157 (1992) which is incorporated herein by reference. In order to calculate the quantum physical state of the material, the first-principle calculation (e.g., calculating from the fundamental equation without any external parameter) is conducted based on the density-functional-theory (DFT) method wherein the quantum physical equation is solved by describing the distribution of the electrons using an electron density function instead of a wave function, and thereby obtaining the quantum physical state of the electrons. The electron state is calculated by the Vienna Ab initio simulation package code (VASP), which is the first principle DFT code.

The metal may include a noble metal, a transition metal, an alkali metal, a rare earth metal, or a combination thereof.

Examples of the metal having a work function lower than that of the ruthenium oxide may be summarized in Table 1:

TABLE 1

| Element | Work function (eV) | Element | Work function (eV) |
|---|---|---|---|
| Cs | 2.03 | Nb | 4.3 |
| Rb | 2.22 | Ti | 4.33 |
| Ba | 2.23 | Cu | 4.48 |
| Ra | 2.25 | Cr | 4.5 |
| K | 2.34 | Fe | 4.5 |
| Sr | 2.39 | Ag | 4.52 |
| Eu | 2.42 | Al | 4.54 |
| Yb | 2.45 | W | 4.55 |
| Na | 2.76 | Mo | 4.6 |
| Ca | 2.84 | Ru | 4.71 |
| Y | 3.1 | Os | 4.83 |
| Li | 3.15 | Rh | 4.98 |
| Lu | 3.3 | Co | 5 |
| Sc | 3.5 | Au | 5.31 |
| La | 3.5 | Ni | 5.35 |
| Mg | 3.86 | Pd | 5.6 |
| Hf | 3.9 | Be | 5.62 |
| Zr | 4.05 | Ir | 5.67 |
| Mn | 4.1 | Pt | 5.7 |
| Ta | 4.25 | Re | 5.75 |
| V | 4.3 | | |

In some embodiments, the metal may include silver (Ag), gold (Au), palladium (Pd), platinum (Pt), or a combination thereof. When the sheet resistance of $RuO_{2.1}$ is 22960.7 Ω/sq, as calculated by the simulation, the decrease in the sheet resistance due to the presence of the metal cluster in an amount of 8 at %, 25 at %, 50 at % based on 100 at % of the of the ruthenium metal), may be calculated as shown in Table 2:

TABLE 2

| | σ (S/Cm) | α(/cm) | Ω/sc |
|---|---|---|---|
| $RuO_{2.1}$ | 6.74E+02 | 1.56E+05 | 22960.7 |
| 8% | | | |
| Ag | 2.60E+04 | 9.68E+04 | 370.0 |
| Au | 6.02E+04 | 9.26E+04 | 153.0 |
| Pd | 0.00E+00 | 1.06E+05 | — |
| Pt | 3.33E+04 | 1.10E+05 | 330.0 |
| 25% | | | |
| Ag | 1.39E+04 | 1.41E+05 | 1008.5 |
| Au | 7.08E+04 | 1.87E+05 | 262.7 |
| Pd | 7.79E+03 | 1.04E+05 | 1322.7 |
| Pt | 2.48E+04 | 1.61E+05 | 645.3 |
| 50% | | | |
| Ag | 2.51E+04 | 1.08E+05 | 430.1 |
| Au | 4.00E+03 | 1.11E+05 | 2764.6 |
| Pd | 2.12E+04 | 1.08E+05 | 508.1 |
| Pt | 1.37E+05 | 1.13E+05 | 82.3 |

According to Table 2, when the cluster includes Ag, Au, or Pt in an amount of 8 at %, the sheet resistance of the ruthenium oxide nanosheet may be about 370 Ω/sq, about 153 Ω/sq, and about 330 Ω/sq, respectively. Therefore, the ruthenium oxide nanosheet with the metal cluster may have a sheet resistance that is decreased by about 62 times to about 150 times as compared to the sheet resistance of the original ruthenium oxide nanosheet. In addition, when the Pt cluster is present (e.g., adsorbed) on the nanosheets in an amount of 50 at. %, the sheet resistance of the resulting nanosheet is decreased to only 82 Ω/sq, which is about 280 times lower than the sheet resistance of the original nanosheet. Therefore, according to the aforementioned results, when the ruthenium oxide nanosheets having a sheet resistance of 23,000 ohm/sq. include the aforementioned metal cluster, their sheet resistance may be decreased to less than or equal to about 3,000 ohm/sq., for example, less than or equal to about 2,000 ohm/sq., less than or equal to about 1,500 ohm/sq., less than or equal to about 1000 ohm/sq., less than or equal to about 500 ohm/sq., or even less than or equal to about 100 ohm/sq.

The plurality of the metal clusters may be adsorbed to a surface of the ruthenium oxide nanosheet. As used herein, the phrase "a metal cluster being adsorbed to a surface of the ruthenium oxide nanosheet" refers to the case where metal atoms constituting the metal cluster are not inserted within the lattice structure of the ruthenium oxide (e.g., the metal neither replaces the ruthenium atom nor is inserted as an interstitial atom) but is physically or chemically bound to the surface of the ruthenium oxide nanosheet and thus are not separated therefrom by an external force (e.g., a force which may exerted thereon when they are dispersed in water or a water miscible solvent). In non-limiting examples, FIGS. 2A, 2B, 3, and 4 show a structure wherein the metal cluster 50 or 60 (e.g. Ag) is adsorbed onto the ruthenium oxide nanosheet 40, but it is not limited thereto. For example, in FIGS. 2A and 2B, the silver atom (60) is bound to the oxygen atom (70) that is linked to the ruthenium atom (80) to form a ruthenium oxide lattice structure. Therefore, the adsorption does not bring forth any substantial changes in the X-ray diffraction spectrum of the ruthenium oxide.

In some embodiments, the ruthenium oxide nanosheet may be brought into contact with an aqueous solution including a precursor for the metal cluster (e.g., a solution thereof) and then dried to form a metal cluster on a surface thereof. Types of the precursor for the metal cluster are not particularly limited as long as they are dissolved in water to provide a metal ion. For example, the precursor for the metal cluster may be a water soluble salt of the metal (e.g. a metal salt compound). The metal of the metal salt compound may include a noble metal, a transition metal, an alkali metal, a rare earth metal, or a combination thereof. The water soluble salt may be a nitrate, an acetate, an acetylacetonate, a halide, or a combination thereof. In case of the silver metal, the water soluble salt may be silver nitrate, silver acetate, silver chloride, silver acetyl acetonate, or a combination thereof. In case of the gold metal, the water soluble salt may be gold nitrate, gold acetate, gold chloride, gold acetylacetonate, or a combination thereof. In case of the palladium metal, the water soluble salt may be palladium nitrate, palladium acetate, palladium chloride, palladium acetylacetonate, or a combination thereof. In case of the platinum metal, the water soluble salt may be platinum nitrate, platinum acetate, platinum chloride, platinum acetylacetonate, or a combination thereof.

The size (e.g. a dimension, such as a length or width dimension, such as a dimension along a major surface) of the metal cluster may be greater than or equal to about 1 angstrom, for example, greater than or equal to about 1 nm, greater than or equal to about 2 nm, greater than or equal to about 3 nm, or greater than or equal to about 5 nm. The size of the metal cluster may be less than or equal to about 1000 nm, for example less than or equal to about 500 nm, less than or equal to about 400 nm, less than or equal to about 300 nm, less than or equal to about 200 nm, less than or equal to about 100 nm, or less than or equal to about 30 nm.

The electrical conductor may include the metal constituting the cluster in an amount of greater than or equal to about 1 at. %, for example, greater than or equal to about 5 at. %, or greater than or equal to about 50 at. %, based on 100 at. % of the ruthenium metal. The electrical conductor may include the metal constituting the cluster in an amount of less than or equal to about 500 at. %, for example, greater than or equal to about 200 at. %, or greater than or equal to about 150 at. %, based on 100 atom % of the ruthenium metal. When the aforementioned range of the amount of the metal constituting the cluster is included, the electrical conductor may show enhanced electrical conductivity. The amount of the metal constituting the cluster may be determined by measuring the amount of the cluster metal and the amount of ruthenium via an XPS (X-ray photoelectron spectroscopy) analysis or a SEM-EDS (Energy-dispersive X-ray spectroscopy) analysis, and the atomic percent of the cluster metal with respect to the ruthenium may be calculated therefrom.

The electrical conductor may include a second conductive layer that is disposed on the first conductive layer and includes a plurality of electrically conductive metal nanowires.

Figure 9:
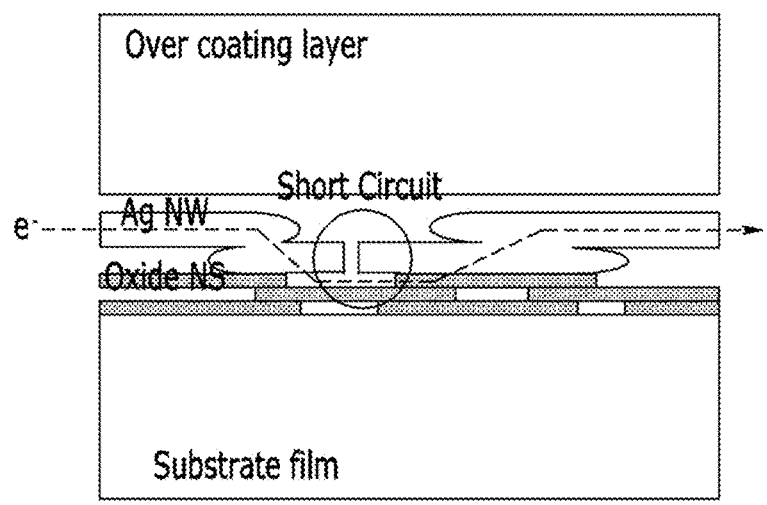
FIG. 9 is a schematic illustration of a conductor according to another embodiment.

Without wishing to be bound by any theory, the one-dimensional conductive metal nanowires and the two-dimensional metal oxide nanosheets form such a hybrid structure in which the metal oxide nanosheet may provide electrical conduction for a break of the conduction path formed by the metal nanowire, as shown schematically in FIG. 9, which illustrates an embodiment in which Ag nanowires (Ag NW) and metal oxide nanosheets (Oxide NS) are disposed between a substrate and an over coating layer. As shown in FIG. 9, conductivity is maintained by the metal oxide nanosheets when a break occurs in the nanowires.

The electrically conductive metal nanowire included in the second conductive layer may include silver (Ag), copper (Cu), gold (Au), aluminum (Al), cobalt (Co), palladium (Pd), or a combination thereof (e.g., an alloy thereof or a nanometal wire having two or more segments). For example, the electrically conductive metal nanowire may include a silver nanowire.

The electrically conductive metal nanowire may have an average diameter of less than or equal to about 50 nanometers (nm), for example less than or equal to about 40 nm, or less than or equal to about 30 nm. The length of the electrically conductive metal nanowire is not particularly limited, and may be appropriately selected considering the diameter. For example, the electrically conductive metal nanowire may have a length of greater than or equal to about 1 micrometer (μm), greater than or equal to about 2 μm, greater than or equal to about 3 μm, greater than or equal to about 4 μm, or greater than or equal to about 5 μm, and is not limited thereto. According to another embodiment, the electrically conductive metal nanowire may have a length of greater than or equal to about 10 μm, for example greater than or equal to about 11 μm, greater than or equal to about 12 μm, greater than or equal to about 13 μm, greater than or equal to about 14 μm, or greater than or equal to about 15 μm. The electrically conductive metal nanowire may be fabricated according to any suitable method and may be a suitable commercially available metal nanowire. The nanowire may comprise a polymeric coating on a surface thereof, such as a coating including polyvinylpyrrolidone.

Various efforts have been made to develop a flexible transparent electrode material having high electrical conductivity and which is transparent to light having a wavelength within the visible range. Metals may have high electron density and high electrical conductivity. However, most metals tend to react with oxygen in air to form an oxide on a surface and thus show greatly reduced electrical conductivity. Attempts to reduce surface contact resistance using a ceramic material (e.g. ITO) having good conductivity and showing reduced surface oxidation have been investigated. However, conductive ceramic materials such as ITO suffer from unstable supply of raw materials. Moreover, the electrical conductivity of conductive ceramic materials is minimal as compared to the electrical conductivity of a metal, and the flexibility tends to be poor. Since graphene as a layered material is reported to have electrical conductive properties, research into the use of a single atom layer thin film of a graphene layered structure material having weak interlayer bonding force has been conducted. For example, there have been attempts to use the graphene as a material that may substitute for the indium tin oxide (ITO) having poor mechanical properties. However, due to a high absorption coefficient, the graphene is unable to provide a satisfactory level of light transmittance and cannot be used at a thickness of greater than or equal to about 4 layers. Transition metal dichalcogenides having a layered crystal structure may show comparable transmittance when prepared as a thin film, but they have semiconductor properties and thus have insufficient electrical conductivity to be used as an electrically conductive film.

In contrast, the ruthenium oxide nanosheets, exfoliated for example by intercalation, may demonstrate good electrical conductivity and enhanced light transmittance and may also contribute to the flexibility of the electrical conductor. Therefore, they may be used as a flexible electrical conductor (e.g., a flexible transparent conductive film).

The first conductive layer may include a discontinuous layer of ruthenium oxide nanosheets which includes an open space between at least two of the ruthenium oxide nanosheets. The amount of open space in the first conductive layer is determined by measured an area of the open space and comparing to a total area of the first conductive layer. For example, a Scanning Electron Microscopic image of the first conductive layer including nanosheets disposed to have an open space is obtained and the area of the open space (i.e., the portion not having the nanosheets in the first conductive layer) is determined and is divided with the total area of the first conductive layer to provide an area ratio. An area of the open space to the total area of the first conductive layer may be less than or equal to about 50%, for example less than or equal to about 40%, less than or equal to about 30%, less than or equal to about 20%, or less than or equal to about 10%. In the electrical conductor, a conductive metal nanowire may extend over the open space of the first conductive layer.

Formation of the first conductive layer and the second conductive layer may be carried out by any suitable method of forming a layer, and is not particularly limited.

In some embodiments, the first conductive layer including the ruthenium oxide nanosheets is disposed on a substrate and the second conductive layer including the conductive metal nanowires is disposed on a surface of the first conductive layer. In this case, the substrate may be disposed on a surface of the first conductive layer which is opposite to the surface on which the second conductive layer is disposed.

The substrate may be a transparent substrate. A material of the substrate is not particularly limited, and it may include a glass substrate, a semiconductor substrate like Si, a polymer substrate, or a combination thereof. Alternatively, the substrate may be laminated with an insulation layer and/or a conductive layer. For non-limiting examples, the substrate may include an inorganic material such as an oxide glass or a glass, a polyester such as polyethylene terephthalate, polybutylene terephthalate, or polyethylene naphthalate, polycarbonate, an acryl-based resin, a cellulose or a derivative thereof, a polymer such as a polyimide, or organic/inorganic hybrid material, or a combination thereof. The thickness of the substrate is also not particularly limited, but may be appropriately selected according to the final product. For example, the substrate may have a thickness of greater than or equal to about 0.5 μm, for example greater than or equal to about 1 μm, or greater than or equal to about 10 μm, but is not limited thereto. The thickness of the substrate may be less than or equal to about 1 mm, for example less than or equal to about 500 μm, or less than or equal to about 200 μm, but is not limited thereto. An additional layer (e.g., an undercoat) may be provided between the substrate and the conductive layer, if desired (e.g., for controlling a refractive index).

The first conductive layer or the second conductive layer may be formed by applying an appropriate coating composition on a substrate or a first conductive layer, respectively, and removing the solvent. The coating composition includes the nanosheets or the nanowires, and may further include an appropriate solvent (e.g., water, an organic solvent miscible with water or immiscible with water, or the like), a binder, and a dispersing agent (e.g., hydroxypropyl methylcellulose (HPMC)).

For example, an ink composition including the metal nanowires is commercially available or may be prepared in any suitable method. For example, the ink composition may include the materials shown in Table 3.

TABLE 3

| | Material | Amount* |
|---|---|---|
| Conductive metal | Conductive metal (e.g. Ag) nanowire aqueous solution (concentration: about 0.001 to about 10.0 wt %) | 5~40 wt % |
| Solvent | Water | 20~70 wt % |
| | Alcohol (ethanol) | 10~40 wt % |
| Dispersing agent | Hydroxypropyl methyl cellulose aqueous solution (conc.: about 0.05 to about 5 wt %) | 1~10 wt % |

*wt % is weight percent

For example, the composition including ruthenium oxide nanosheets may include the components in Table 4.

TABLE 4

| | Material | Amount* |
|---|---|---|
| Conductive material | $RuO_{2+x}$ aqueous solution (concentration: 0.001-10.0 g/L) | 30-70 wt % |
| Solvent | Water | 10-50 wt % |
| | Isopropanol | 1-20 wt % |
| Dispersing agent | Hydroxypropyl methylcellulose aqueous solution (conc.: about 0.05 wt % to about 5 wt %) | 5-30 wt % |

When the concentration of the nanosheet aqueous solution is greater than about 0.001 gram per liter (g/L), a transparent conductor may be prepared to have a desired electrical conductivity by including a sufficient number of $RuO_{2+x}$ nanosheets. When the concentration of the nanosheet aqueous solution is less than about 10.00 g/L, a transparent and flexible conductor may be prepared without any substantial loss of transparency or flexibility. In addition, in order to increase a dispersibility of $RuO_{2+x}$ nanosheets, the $RuO_{2+x}$ nanosheet solution may include a dispersing agent, such as a hydroxypropyl methyl cellulose (HPMC) aqueous solution. The concentration of the HPMC aqueous solution may be from about 0.05 weight percent (wt %) to about 5 wt %. Within these ranges, it is possible to maintain the dispersibility of the $RuO_{2+x}$ nanosheets without causing any adverse effects by the organic substances, for example, a decrease in electrical conductivity, or a decrease in transmittance.

The composition may be applied onto a substrate (or optionally, on the first or second conductive layer), and then may be dried and/or heat-treated if desired to produce the conductive layer. The coating of the composition may be performed by various methods, for example bar coating, blade coating, slot die coating, spray coating, spin coating, gravure coating, inkjet printing, or a combination thereof.

The nanosheets may be in contact with each other to provide an electrical connection. When the prepared nanosheets are physically connected to provide as thin a layer as possible, it may provide further improved transmittance.

The first conductive layer and/or the second conductive layer may include an organic binder for binding the nanowires and/or the nanosheets. The binder may play a role in appropriately adjusting the viscosity of the composition for a conductive layer or enhancing adherence of the nanosheets to the substrate. Examples of the binder may include, but are not limited to, methyl cellulose, ethyl cellulose, hydroxypropyl methyl cellulose (HPMC), hydroxypropyl cellulose (HPC), xanthan gum, polyvinyl alcohol (PVA), polyvinylpyrrolidone (PVP), carboxylmethyl cellulose, hydroxyethyl cellulose, or a combination thereof. An amount of binder may be appropriately selected, and is not particularly limited. In non-limiting examples, an amount of the binder may be about 1 to about 100 parts by weight, based on 100 parts by weight of the nanosheets (or the nanowires).

The electrical conductor may further include an overcoating layer (OCL) including a thermosetting resin, an ultraviolet (UV)-curable resin, or a combination thereof, on at least one of the first conductive layer and the second conductive layer. Examples of the thermosetting resin and the ultraviolet (UV)-curable resin for the OCL are known in the art. In some embodiments, the thermosetting resin and the UV-curable resin for the OCL may include urethane (meth)acrylate, a perfluoropolymer having a (meth)acrylate group, a poly(meth)acrylate having a (meth)acrylate group, an epoxy(meth)acrylate, or a combination thereof. The overcoating layer may further include an inorganic oxide fine particle (e.g., a silica fine particle). A method of forming an OCL from the aforementioned materials on the conductive layer is also known and is not particularly limited.

The electrical conductor may exhibit enhanced flexibility. For example, after being folded, the electrical conductor may have a resistance change that is significantly lower than a resistance of an electrical conductor including only the nanowires. In some embodiments, the electrical conductors may have a resistance change of less than or equal to about 60%, for example, less than or equal to about 50%, less than or equal to about 40%, or less than or equal to about 30% after folding 200,000 times at a curvature radius (e.g. bend radius) of 1 millimeter (mm) (1R bending).

The electrical conductor having the aforementioned structure may have significantly improved conductivity and high light transmittance and may provide enhanced flexibility. The electrical conductor may have light transmittance of greater than or equal to about 85%, for example greater than or equal to about 88%, or greater than or equal to about 89%, with respect to light having a wavelength of 550 nm (or with respect to visible light, for example having a wavelength of 400 nm to 700 nm) at a thickness (for example, of the first and/or the second conductive layers) of less than or equal to about 100 nm (e.g., less than or equal to about 90 nm, less than or equal to about 80 nm, less than or equal to about 70 nm, less than or equal to about 60 nm, or less than or equal to about 50 nm). The electrical conductor may have a sheet resistance of less than or equal to about 5,000 ohms pre square ($\Omega$/sq), for example, less than or equal to about 3,000 $\Omega$/sq, less than or equal to about 2,500 $\Omega$/sq, less than or equal to about 2,400 $\Omega$/sq, less than or equal to about 2,300 $\Omega$/sq, or less than or equal to about 2,200 $\Omega$/sq as measured by four point probe method, for example, when it has the second conductive layer or by having metal clusters on a surface of the nanosheets (see Example 3, Conductor 3).

The sheet resistance may be less than about 100 ohms per square ($\Omega$/sq), for example, less than or equal to about 90 $\Omega$/sq, less than or equal to about 80 $\Omega$/sq, less than or equal to about 70 $\Omega$/sq, less than or equal to about 60 $\Omega$/sq, less than or equal to about 50 $\Omega$/sq, less than or equal to about 40 $\Omega$/sq, less than or equal to about 39 $\Omega$/sq, less than or equal to about 38 $\Omega$/sq, less than or equal to about 37 $\Omega$/sq, less than or equal to about 36 $\Omega$/sq, or less than or equal to about 35 $\Omega$/sq.

In other embodiments, a method of producing the aforementioned electrical conductor may include:
  providing a first conductive layer including a ruthenium oxide nanosheet;
  dissolving a metal salt compound in water to obtain an aqueous metal salt solution; and
  contacting the aqueous metal salt solution with a surface of the first conductive layer for a predetermined time to form a plurality of metal clusters on the surface of the first conductive layer.

The ruthenium oxide nanosheets, the formation of the first conductive layer including the ruthenium oxide nanosheets, and the metal clusters and the formation of the plurality of the metal clusters on a surface of the first conductive layer, are the same as set forth above.

The concentration of the metal salt compound in the aqueous metal salt solution is not particularly limited as long as it may result in the formation of the metal cluster. For example, the concentration of the metal salt compound in the aqueous metal salt solution may be greater than or equal to about 0.001 mol/L, for example, greater than or equal to about 0.005 mol/L, greater than or equal to about 0.01 mol/L, or greater than or equal to about 0.05 mol/L.

The contacting may include immersion (e.g., dipping), spraying, coating, or a combination thereof. The contacting time is not particularly limited and may be appropriately selected by the person of skill in the art without undue experimentation. For example, the contacting time may be greater than or equal to about 1 minute, for example, greater than or equal to about 10 minutes, greater than or equal to about 1 hour, or greater than or equal to about 2 hours.

The method may further include washing the surface of the first conductive layer with a solvent (e.g., a C1 to C5 alcohol) to remove the metal salt compound on the surface of the first conductive layer.

In another embodiment, an electronic device includes the electrical conductor or the hybrid structure.

The electronic device may be a flat panel display, a touch screen panel, a solar cell, an e-window, an electrochromic mirror, a heat mirror, a transparent transistor, or a flexible display.

Figure 8:
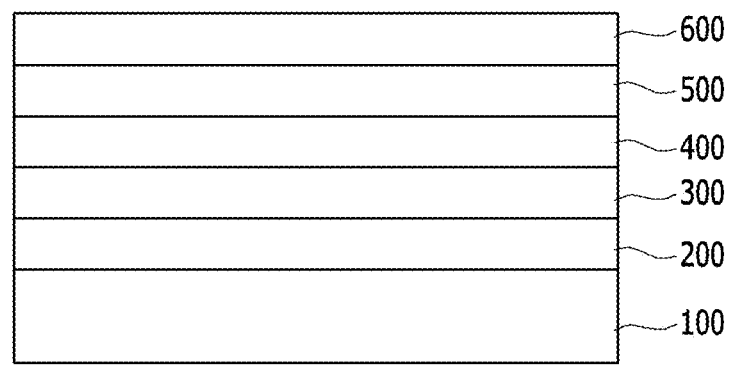
FIG. 8 is a schematic cross-sectional view of an electronic device (a touch screen panel) according to an embodiment.

In an exemplary embodiment, the electronic device may be a touch screen panel (TSP). The detailed structure of the touch screen panel can be determined by one of skill in the art without undue experimentation. The schematic structure of the touch screen panel is shown in FIG. 8. Referring to FIG. 8, the touch screen panel may include a display panel 100, a first transparent electrically conductive film 200, a first transparent adhesive film (e.g., an optically clear adhesive (OCA) layer) 300, a second transparent electrically conductive film 400, a second transparent adhesive film (e.g. optically clear adhesive layer) 500, and a window 600 for a display device, on a panel for a display device (e.g., an LCD panel). The first transparent electrically conductive layer 200 and/or the second transparent electrically conductive layer 400 may correspond to the above-described electrical conductor 10.

In addition, an example of applying the electrical conductor to a touch screen panel (e.g., a transparent electrode of TSP) is described above, however, the electrical conductor is not limited thereto and may be used as an electrode for other electronic devices which include a transparent electrode. For example, the conductor may be applied as a pixel electrode and/or a common electrode for a liquid crystal display (LCD), an anode and/or a cathode for an organic light emitting diode device, or a display electrode for a plasma display device.

Hereinafter, an embodiment is illustrated in more detail with reference to examples. These examples, however, are not in any sense to be interpreted as limiting the scope of this disclosure.

EXAMPLES

[1] Measurement of sheet resistance:
Sheet resistance is measured as follows.
Measuring equipment: Mitsubishi loresta-GP (MCP-T610), ESP type probes (MCP-TP08P)
Sample size: width 20 cm×length 30 cm
Measurement: average value obtained by measuring at least 9 times

[2] Measurement of light transmittance:
Light transmittance is measured as follows.
Measuring equipment: NIPPON DENSHOKU INDUSTRIES (NDH-7000 SP)
Sample size: width 20 cm×length 30 cm
Measurement: average value obtained from measuring at least 9 times
The wavelength of the light source: 550 nm or a whole range of 400 nm to 700 nm.

[3] Measurement of haze:
Haze is measured as follows.
Measuring equipment: NIPPON DENSHOKU INDUSTRIES (NDH-7000 SP)
Sample size: width 20 cm×length 30 cm
Measurement: average value obtained from measuring at least 9 times

[4] Scanning Electron Microscope (SEM) analysis, Atomic Force Microscope (AFM) analysis, and an X-ray Diffraction analysis are made using:
FE-SEM (Field Emission Scanning Electron Microscopy) NovaNano SEM 450 (FEI Co., Ltd.), Atomic Force Microscope (SPM) Bruker (Icon), an X-ray diffractometer (from Bruker, D8 Advance), respectively.

Preparation Example 1: Synthesis of Ruthenium Oxide Nanosheet Via Exfoliation Using Two Types of Intercalants $K_2CO_3$ and $RuO_2$ are mixed at a mole ratio of 5:8, and the mixture is pelletized. 4 grams (g) of the obtained pellet is introduced into an alumina crucible and heated in a tube furnace at 850° C. for 12 hours (h) under a nitrogen atmosphere. The total weight of the pellet may be changed within the range of 1 g to 100 g if desired. Then, the furnace is cooled to room temperature, and the treated pellet is removed and ground to a fine powder.

The obtained fine powder is washed with 100 milliliters (mL) to 4 liters (L) of water for 24 h, and then filtered to provide a powder, the composition of which is $K_{0.2}RuO_{2.1} \cdot nH_2O$. The $K_{0.2}RuO_{2.1} \cdot nH_2O$ powder is then introduced into a 1 molar (M) HCl solution, agitated for 3 days (d) and then filtered to provide a powder, the composition of which is $H_{0.2}RuO_{2.1}$.

1 g of the obtained $H_{0.2}RuO_{2.1}$ powder is introduced into 250 mL of an aqueous solution of tetramethyl ammonium hydroxide (TMAOH) and tetrabutylammonium hydroxide (TBAOH), and agitated for greater than or equal to 10 d. In the aqueous solution, the concentrations of TMAOH and TBAOH are TMA+/H+=3 and TBA+/H+=3, respectively. After completing all processes, the final solution is centrifuged under the conditions of 2000 revolutions per minute (rpm) and 30 minutes (min) to obtain delaminated $RuO_{2.1}$ nanosheets.

Results of Scanning Electron Microscopy (SEM) analysis for 100 nanosheets confirm that the average lateral size of the nanosheets is 6.96 μm. The obtained nanosheets are subjected to X-ray diffraction analysis, and the results thereof confirm that the distance between the layers is 0.935 nm.

An Atomic Force Microscope (AFM) is used to measure the thickness of the nanosheets, and the results thereof confirm that the average thickness is determined to be 1.66 nanometers (nm).

Figure 5:
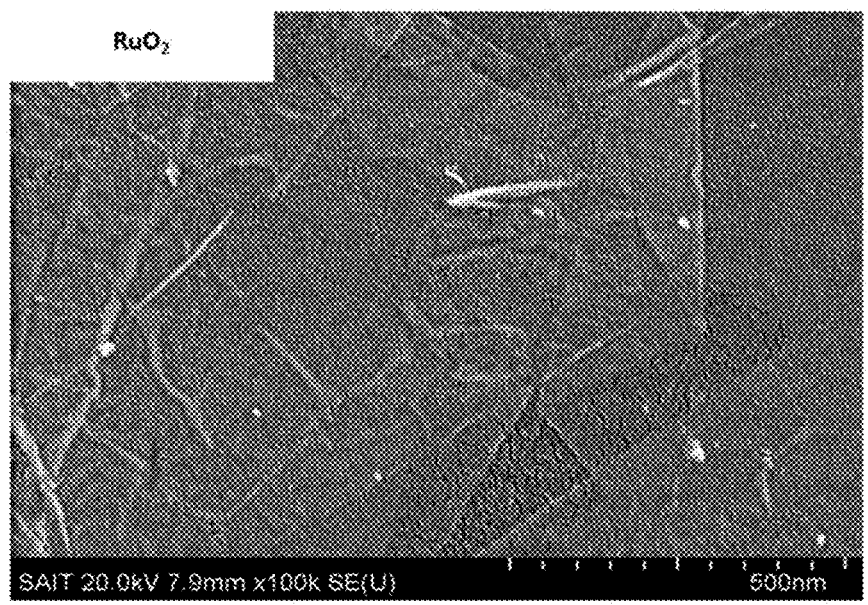
FIG. 5 is a scanning electron microscope image of an electrical conductor including ruthenium oxide nanosheets of Preparation Example 2, prior to the formation of a metal cluster.

Preparation Example 2: Formation of a Conductive Layer Including the Ruthenium Oxide Nanosheet A coating liquid including the $RuO_{2.1}$ nanosheets obtained from Preparation Example 1 and having the following composition is prepared.
Aqueous dispersion of the obtained $RuO_{2.1}$ nanosheets (conc.: 1 g/L): 3 g
HPMC aqueous solution (conc.: 0.3 wt %): 0.5 g
Isopropanol: 3 g
Water: 1 g A small amount of TBAOH and TMAOH are detected from the obtained $RuO_{2.1}$ nanosheet coating liquid, which originate from the intercalants used for exfoliation of $RuO_{2.1}$ nanosheets. The $RuO_{2.1}$ nanosheet coating liquid is bar-coated on a polycarbonate substrate (thickness: 100 μm) and dried at 85° C. under an air atmosphere for about 3 minutes. The processes are repeated several times to provide a conductive layer having a thickness of 3 nm. The scanning electron microscopic image of a surface of the obtained conductive layer is shown in FIG. 5.

The sheet resistance and the light transmittance of the obtained conductive layer is about $2.48 \times 10^4$ Ω/sq and 92.4%, respectively. The haze is about 1.35.

Example 1

In order to conduct the adsorption of Ag clusters on the conductive layer including the $RuO_{2.1}$ nanosheets obtained in Preparation Example 2, a $AgNO_3$ aqueous solution having a concentration of 0.05M is prepared. The conductive layer obtained in Preparation Example 2 is immersed in the $AgNO_3$ aqueous solution and is taken out after 12 hours. The resulting surface of the conductive layer is washed with ethanol to obtain a conductor including $RuO_{2.1}$ nanosheets with silver clusters on the surface of the nanosheets.

Figure 6A:
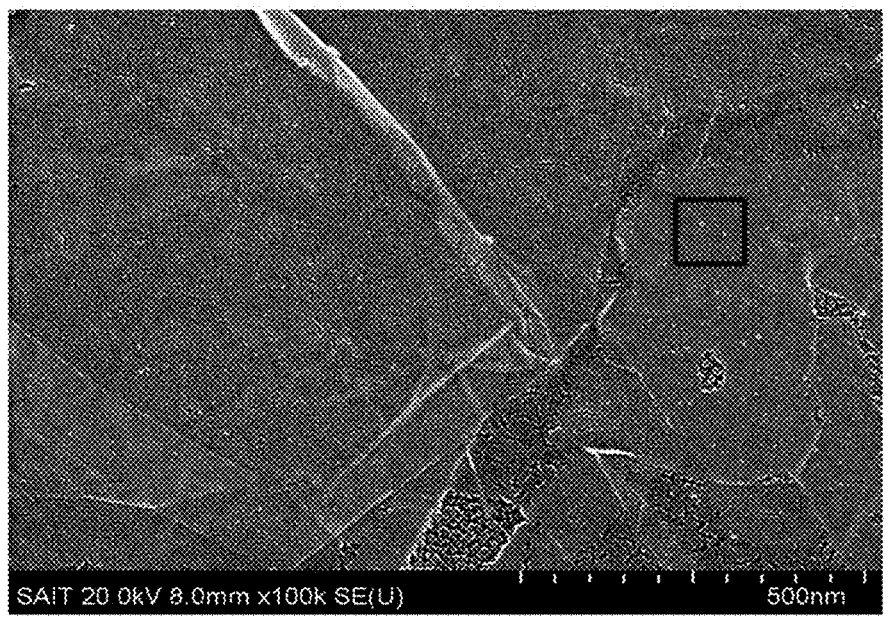
FIG. 6A is a scanning electron microscope image of the electrical conductor of Example 1 which includes ruthenium oxide nanosheets and metal clusters formed thereon.
Figure 6B:
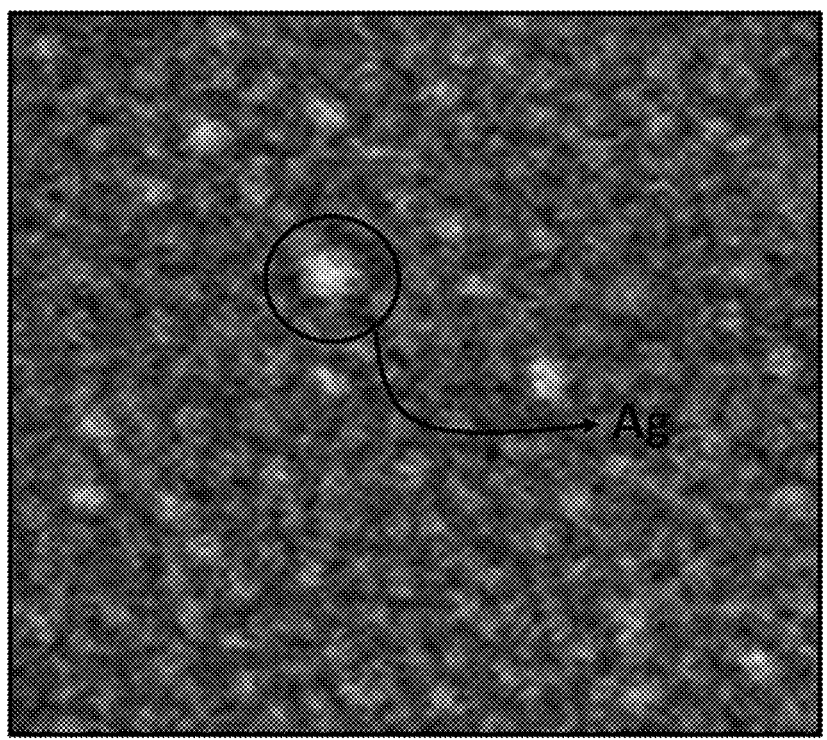
FIG. 6B is an increased magnification of a portion of the ruthenium oxide nanosheets with nano sized metal clusters.

The scanning electron microscopic image of the obtained conductor is shown in FIGS. 6A and 6B, which confirms that the silver clusters are formed on a surface of the nanosheets. The sheet resistance and the light transmittance of the obtained conductor are about $1.87 \times 10^4$ Ω/sq and 90%, respectively. In comparison with the conductive layer prior to the adsorption of the Ag cluster, the light transmittance is similar but the sheet resistance is decreased by 25%. The haze is about 1.43.

Energy Dispersive X-ray Spectroscopy (EDS) and the Scanning Electron Microscope (SEM) with respect to the obtained conductor reveals that the cluster of the surfaces of the ruthenium oxide nanosheets is silver (Ag), and is not $AgNO_3$.

Example 2

A conductive layer including ruthenium oxide nanosheets is formed on a surface of the conductor obtained in Example 1 using the same method described in Preparation Example 2. The obtained conductive layer is subjected to the same procedure set forth in Example 1 to form the silver cluster, and thereby the final conductor includes the $RuO_{2.1}$ nanosheets having silver clusters not only on a surface of the ruthenium oxide nanosheet but also between the ruthenium oxide nanosheets.

Figure 7:
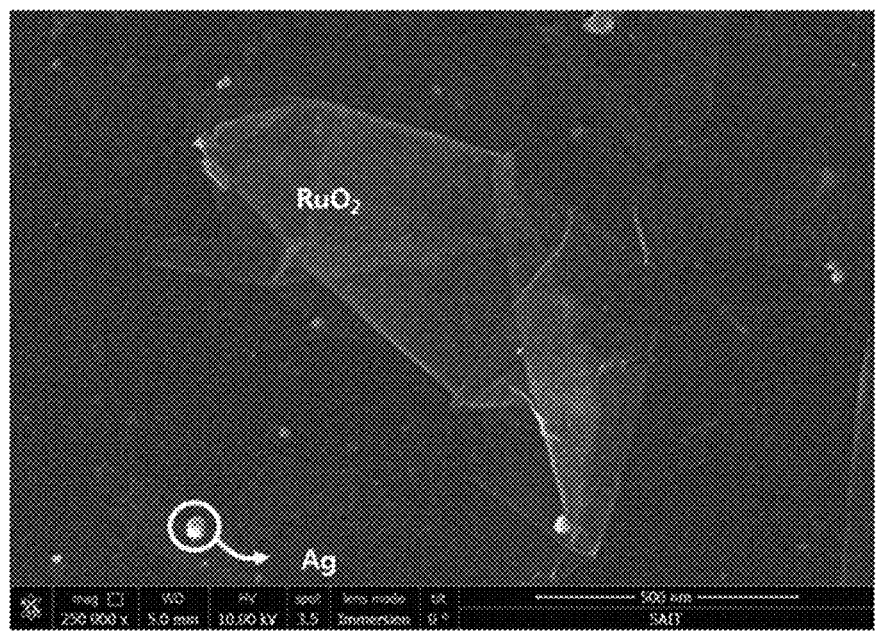
FIG. 7 is a scanning electron microscope image of the electrical conductor of Example 2 which includes ruthenium oxide nanosheets and silver clusters between the ruthenium oxide nanosheets.

The scanning electron microscopic image of the obtained conductor is shown in FIG. 7, which confirms that the silver clusters are formed on a surface of the nanosheets.

The sheet resistance and the light transmittance of the obtained conductive layer are about $6.76 \times 10^3$ Ω/sq and 91.8%, respectively. In comparison with the conductor prior to the adsorption of the Ag cluster, the light transmittance is slightly improved and the sheet resistance is decreased by 73%. The haze is about 1.18.

Example 3

A conductive layer including the ruthenium oxide nanosheets is formed in a similar manner to Preparation Example 2.

In order to conduct the adsorption of Ag clusters on the conductive layer including $RuO_{2.1}$ nanosheets, a $AgNO_3$ aqueous solution having a concentration of 0.2 M is prepared. The conductive layer formed above is immersed in the $AgNO_3$ aqueous solution and is taken out after 12 hours. The resulting surface of the conductive layer is washed with ethanol to obtain Conductor 1 including $RuO_{2.1}$ nanosheets with silver clusters on each surface.

In order to conduct the adsorption of Ag clusters on the conductive layer including $RuO_{2.1}$ nanosheets, a $CH_3CO_2Ag$ aqueous solution having a concentration of 0.05 M is prepared. The conductive layer as formed above is immersed in the $CH_3CO_2Ag$ aqueous solution and is taken out after 12 hours. The resulting surface of the conductive layer is washed with ethanol to obtain Conductor 2 including $RuO_{2.1}$ nanosheets with silver clusters on each surface.

In order to conduct the adsorption of Ag clusters on the conductive layer including $RuO_{2.1}$ nanosheets, a $CH_3CO_2Ag$ aqueous solution having a concentration of 0.05 M is prepared. The conductive layer as formed above is immersed in the $CH_3CO_2Ag$ aqueous solution and is taken out after 72 hours. The resulting surface of the conductive layer is washed with ethanol to obtain Conductor 3 including $RuO_{2.1}$ nanosheets with silver clusters on each surface.

With respect to Conductor 1, Conductor 2, and Conductor 3, the sheet resistance, the light transmittance, and the haze are measured and the results are summarized in Table 5.

TABLE 5

| | Properties | $RuO_{2.1}$ | $RuO_{2.1}$/Ag | Change rate |
|---|---|---|---|---|
| Conductor 1 $AgNO_3$ 0.2M, 12h | sheet resistance (Ω/sq) | $1.57 \times 10^4$ | $1.18 \times 10^4$ | −24.8% |
| | light transmittance (%) | 93.50 | 94.00 | 0.5% |
| | Haze | 0.62 | 0.64 | 3.2% |
| Conductor 2 $CH_3CO_2Ag$ 0.05M, 12h | sheet resistance (Ω/sq) | $2.25 \times 10^4$ | $1.97 \times 10^4$ | −12.4% |
| | light transmittance (%) | 94.05 | 94.28 | 0.2% |
| | Haze | 0.52 | 0.96 | 84.6% |
| Conductor 3 $CH_3CO_2Ag$ 0.05M, 72h | sheet resistance (Ω/sq) | $9.59 \times 10^3$ | $2.16 \times 10^3$ | −77.5% |
| | light transmittance (%) | 95.20 | 95.40 | 0.2% |
| | Haze | 0.53 | 0.59 | 11.3% |

The scanning electron microscopic analysis of Conductor 1, Conductor 2, and Conductor 3 confirms that the Ag particles (i.e., Ag clusters) having a size (e.g. a dimension as measured by SEM) of about 10 to about 20 nm are adsorbed on the surface of the ruthenium oxide nanosheets. In addition, the sheet resistance of Conductor 1, Conductor 2, and Conductor 3 is decreased by about 24.8%, 12.4%, and 77.5%, respectively as compared to the conductor prior to absorption of the Ag particles.

Example 4: Preparation of a Conductor Including a Nanowire Layer and a Ruthenium Oxide Nanosheets Layer

[1] A coating liquid including the $RuO_{2.1}$ nanosheets obtained from Preparation Example 1 and having the following composition is prepared.

Aqueous dispersion of the obtained $RuO_{2.1}$ nanosheets: 3 g

HPMC aqueous solution (0.3 wt %): 0.5 g

Isopropanol: 3 g

Water: 1 g

A small amount of TBAOH and TMAOH are detected from the obtained $RuO_{2.1}$ nanosheet coating liquid, which originate from the intercalants used for exfoliation of the nanosheets. The $RuO_{2.1}$ nanosheet coating liquid is bar-coated on a polycarbonate substrate and dried at 85° C. under an air atmosphere. The processes are repeated 3 times to provide a first conductive layer. It is confirmed that the first conductive layer obtained by the bar coating has a thickness of about 1 to 5 nm. The sheet resistance of the obtained second conductive layer is measured by 4 point probe measurement (specimen size: width of 10 cm×length of 10 cm, measurement equipment manufactured by Mitsubishi Chemical Analytech, model name: MCP-T610). Transmittance is measured by using a haze meter (manufactured by Nippon Denshoku, model name: NDH-7000SP) considering only the material absorption except the light absorption of the substrate. As a result, the sheet resistance is $1.20 \times 10^5$ Ω/sq and the transmittance is 92.4%.

[2] Ag nanowire containing coating liquid including the following components is prepared.

Ag nanowire aqueous solution (conc.; 0.5 wt %, the average diameter of the Ag nanowire=30 nm): 3 g Solvent: water 7 g and ethanol 3 g Binder: hydroxypropyl methyl cellulose aqueous solution (conc.: 0.3%) 0.5 g The Ag nanowire-containing coating liquid is bar-coated on the first conductive layer and then is dried at 85° C. under an air atmosphere for one min to produce an electrical conductor.

[3] A SEM analysis is conducted for the obtained electrical conductor and the results confirm that the electrical conductor has a hybrid structure of the ruthenium oxide nanosheets/the silver nanowire.

The sheet resistance and the transmittance of the electrical conductor are measured in the same manner as set forth above. As a result, the sheet resistance is 33.39 Ω/sq and the transmittance is 89.1%.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrical conductor comprising:
a first conductive layer comprising a plurality of ruthenium oxide nanosheets,
wherein the plurality of ruthenium oxide nanosheets comprises an electrical connection between contacting ruthenium oxide nanosheets, and
at least one ruthenium oxide nanosheet of the plurality of ruthenium oxide nanosheets comprises a plurality of metal clusters on a surface of the at least one ruthenium oxide nanosheet.

2. The electrical conductor of claim 1, wherein the plurality of metal clusters are adsorbed on the surface of the at least one ruthenium oxide nanosheets.

3. The electrical conductor of claim 1, wherein the plurality of metal clusters are present on a top surface of the plurality of ruthenium oxide nanosheets, between two ruthenium oxide nanosheets, or on the top surface of the plurality of ruthenium oxide nanosheets and between two ruthenium oxide nanosheets.

4. The electrical conductor of claim 1, wherein the metal cluster comprises a metal having a work function that is less than a work function of the ruthenium oxide.

5. The electrical conductor of claim 4, wherein the metal comprises a noble metal, a transition metal, an alkali metal, a rare earth metal, or a combination thereof.

6. The electrical conductor of claim 4, wherein the metal comprises Cs, Rb, Ba, Ra, K, Sr, Eu, Yb, Na, Ca, Y, Li, Lu, Sc, La, Mg, Hf, Zr, Mn, Ta, V, Nb, Ti, Cu, Cr, Fe, Ag, Al, W, Mo, Ru, Os, Rh, Co, Au, Ni, Pd, Be, Ir, Pt, Re, or a combination thereof.

7. The electrical conductor of claim 1, wherein the cluster has a dimension that is greater than about 1 angstrom and less than or equal to about 1000 nanometers.

8. The electrical conductor of claim 1, wherein the metal cluster comprises a metal, and an amount of the metal is greater than or equal to about 1 atomic percent, based on 100 atomic percent of the ruthenium metal.

9. The electrical conductor of claim 1, further comprising a second conductive layer, which is disposed on a surface of the first conductive layer and comprises a plurality of conductive metal nanowires.

10. The electrical conductor of claim 1, wherein the conductive metal nanowires comprise silver, copper, gold, aluminum, cobalt, palladium, or a combination thereof.

11. The electrical conductor of claim 1, wherein the electrical conductor is a transparent conductive film.

12. The electrical conductor of claim 1, wherein the ruthenium oxide nanosheets have an average lateral dimension of greater than or equal to about 0.5 micrometer and less than or equal to about 100 micrometers, and have an average thickness of less than or equal to about 3 nanometers.

13. The electrical conductor of claim 1, wherein the first conductive layer is a discontinuous layer comprising an open space between at least two of the ruthenium oxide nanosheets of the plurality of ruthenium oxide nanosheets, and wherein an area of the open space with respect to a total area of the first conductive layer is less than or equal to about 50%.

14. The electrical conductor of claim 9, wherein the electrical conductor has a sheet resistance of less than or equal to about 5,000 ohms per square as measured by a four point probe method, and a light transmittance of greater than or equal to about 85 percent for light having a wavelength of 550 nanometers at a thickness of less than or equal to about 100 nanometers.

15. The electrical conductor of claim 1, wherein the first conductive layer further comprises a binder.

16. The electrical conductor of claim 9, wherein the electrical conductor further comprises an overcoating layer comprising a thermosetting resin, an ultraviolet-curable resin, or a combination thereof on at least one of the first conductive layer and the second conductive layer.

17. A method of producing an electrical conductor of claim 1, the method comprising:
providing a first conductive layer including a ruthenium oxide nanosheet;
dissolving a metal salt compound in water to obtain an aqueous metal salt solution; and
contacting the aqueous metal salt solution with a surface of the first conductive layer for a predetermined time to form a plurality of metal clusters on the surface of the first conductive layer.

18. The method of claim 17, wherein a metal of the metal salt compound has a work function less than a work function of the ruthenium oxide.

19. The method of claim 17, wherein the metal comprises a noble metal, a transition metal, an alkali metal, a rare earth metal, or a combination thereof.

20. The method of claim 17, wherein a concentration of a metal salt compound in the aqueous metal salt solution is greater than or equal to about 0.001 moles per liter.

21. The method of claim 17, wherein the contacting comprises dipping, spraying, coating, or a combination thereof.

22. The method of claim 17, further comprising washing the surface of the first conductive layer with a solvent to remove the metal salt compound.

23. An electronic device comprising the electrical conductor of claim 1.

24. The electronic device of claim 23, wherein the electronic device comprises a flat panel display, a touch screen panel, a solar cell, an e-window, an electrochromic mirror, a heat mirror, a transparent transistor, a flexible display, or a combination thereof.

* * * * *